(12) United States Patent
Cobbley et al.

(10) Patent No.: US 7,036,086 B2
(45) Date of Patent: Apr. 25, 2006

(54) DISPLAYING SOFTWARE KEYBOARD IMAGES

(75) Inventors: David A. Cobbley, Portland, OR (US); Nitin Gupta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 09/754,553

(22) Filed: Jan. 4, 2001

(65) Prior Publication Data

US 2002/0085038 A1 Jul. 4, 2002

(51) Int. Cl.
*G09G 5/00* (2006.01)

(52) U.S. Cl. .................. 715/773; 715/744
(58) Field of Classification Search ........... 345/744, 345/866, 784, 173; 715/773, 784, 745, 746, 715/780
See application file for complete search history.

(56) References Cited

U.S. PATENT DOCUMENTS

| | | | |
|---|---|---|---|
| 5,818,451 A * | 10/1998 | Bertram et al. | 345/840 |
| 6,230,170 B1 * | 5/2001 | Zellweger et al. | 715/512 |
| 6,300,947 B1 * | 10/2001 | Kanevsky | 345/866 |
| 6,359,572 B1 * | 3/2002 | Vale | 341/23 |
| 6,424,359 B1 * | 7/2002 | Kobayashi | 345/786 |
| 6,442,440 B1 * | 8/2002 | Miller | 700/83 |
| 6,456,305 B1 * | 9/2002 | Qureshi et al. | 345/800 |
| 6,501,464 B1 * | 12/2002 | Cobbley et al. | 345/173 |

* cited by examiner

*Primary Examiner*—Kristine Kincaid
*Assistant Examiner*—Thanh Vu
(74) *Attorney, Agent, or Firm*—Trop, Pruner & Hu, PC

(57) ABSTRACT

A keyboard image may be displayed on the display of a processor-based system to facilitate the entry of data. The keyboard image may include a plurality of key images which may be user selected to make data entries. The keyboard image may be positioned on the display and any data entry areas or other associated textual matter may be moved to facilitate the simultaneous display of data entry areas, associated text or graphics, and the keyboard image without substantial obstruction.

20 Claims, 5 Drawing Sheets

DISPLAYING SOFTWARE KEYBOARD IMAGES

BACKGROUND

This invention relates generally to the use of software keyboards or keyboard images that are displayed in connection with processor-based systems.

In a number of cases, it may be desirable to display an image of a keyboard for enabling data entry. For example, a separate keyboard peripheral may not be available. In connection with wireless devices, it may be impractical to include a keyboard for size and power consumption reasons. Data entry may be facilitated by displaying a keyboard image and allowing the user to select key images corresponding to the characters and information the user wishes to enter.

In one case, data entry areas may be provided in a variety of software situations including Internet web pages. Data may be entered by enabling the user to select a pop up keyboard image. The user then selects the desired keys to enter the required data.

The selection of the key images may be done using a touch screen. The user may tap the desired key images or may use a stylus to select the key images. In other cases, a mouse cursor may be positioned over the desired key images and those images may be mouse clicked on to enter the desired text character-by-character.

In many cases the size of the overall screen display is such that the imposition of the keyboard image may obscure important data displayed on the display screen. For example, the actual data entry areas may be obscured by the keyboard image itself. This obstruction complicates text entry since the user may be unable to clearly see the data entry area to determine what text should be entered.

A number of techniques have been proposed to overcome this problem. One approach is to use a semi-transparent keyboard image. However, the generation of such a keyboard image may be complicated in some cases and the semitransparent keyboard image still, to some degree, obscures the underlying text. In another approach, the keyboard image may be of such reduced size that the likelihood that it would obscure data entry areas may be reduced. However, a deficiency in this approach is that the keyboard image may be sufficiently small in such case that data entry is relatively difficult. And again, even though small, the keyboard image may obscure the data entry area. In still another possible approach, the entire data entry field disappears and the associated display is replaced entirely by a keyboard image. Again, this complicates information entry since it is not then known where to input the information or what information to input. In still another possible approach, the keyboard image may be moved to a corner or an edge of the display screen to reduce the likelihood that the image obstructs a text entry field. However, again, the keyboard image may be too small or may still obstruct data entry areas and too much of the context around the data area field may be obscured. This context may be needed to understand what information must be entered into the data entry area.

Thus there is a need for a better way to facilitate the entry of data using keyboard images on processor-based system displays.

DETAILED DESCRIPTION

Figure 1:
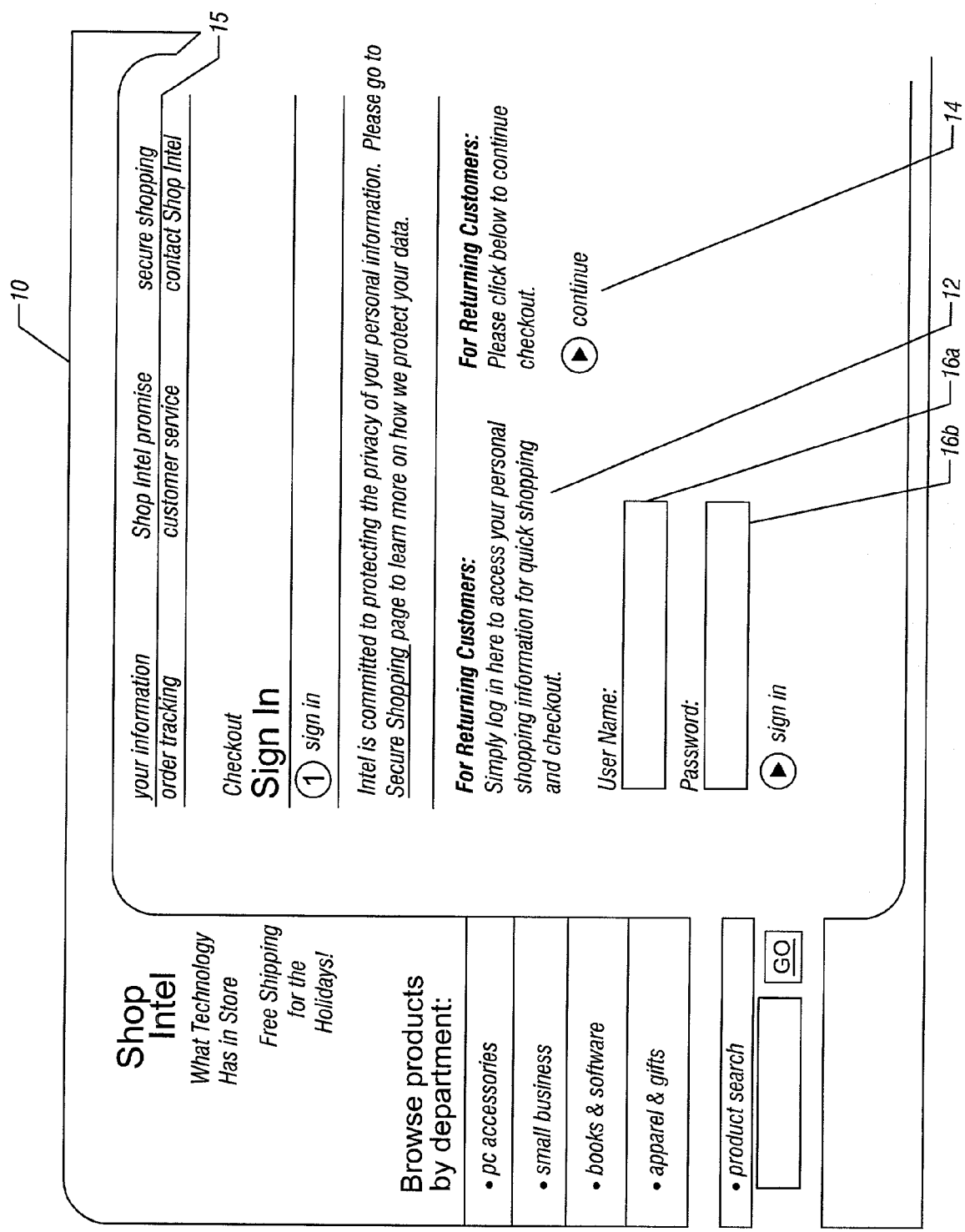
FIG. 1 is a depiction of a screen display in accordance with one embodiment of the present invention.

Referring to FIG. 1, an exemplary graphical user interface or screen display 10 may be a web page received from an Internet web server. The screen display 10 may be displayed on the display of a processor-based system. The processor-based system may be a desktop computer, a laptop computer, a set-top box, any of a variety of portable processor-based devices such as a web tablet, a personal digital assistant or a processor-based appliance, to mention a few examples.

The screen display 10 may be used, for example, to complete an Internet transaction in which a user enters the user's name in a data entry area 16*a* and a password in a data entry area 16*b*. The display 10 includes a field 12 for returning customers and a field 14 for new customers. Thus, if the particular user is a returning customer, the user enters a user name and password in the data entry areas 16 in the field 12. If a user is a new customer, the user selects the continue icon in the field 14. The screen display 10 is exemplary only and is not intended to in any way limit the scope of the present invention.

As used herein, "data entry areas" may be character entry blocks or boxes or any other area designated for the entry of text or numeric data and any associated contextual text or graphics information, such as instructions for inserting data. Particularly, in connection with Internet web pages, data entry areas such as text entry blocks may use particular coding such as hypertext markup language (HTML) coding or other languages including extensible mark up language (XML), JAVA applets, Flash, ActiveX, or Shockwave components as a few examples. This coding may be identified to determine, within the code, whether or not a data entry area having specified characteristics, is used on a given web page. Thus, the presence of data entry areas 16 can be readily determined, for example, in association with Internet web pages by scanning the web page's code.

Figure 2:
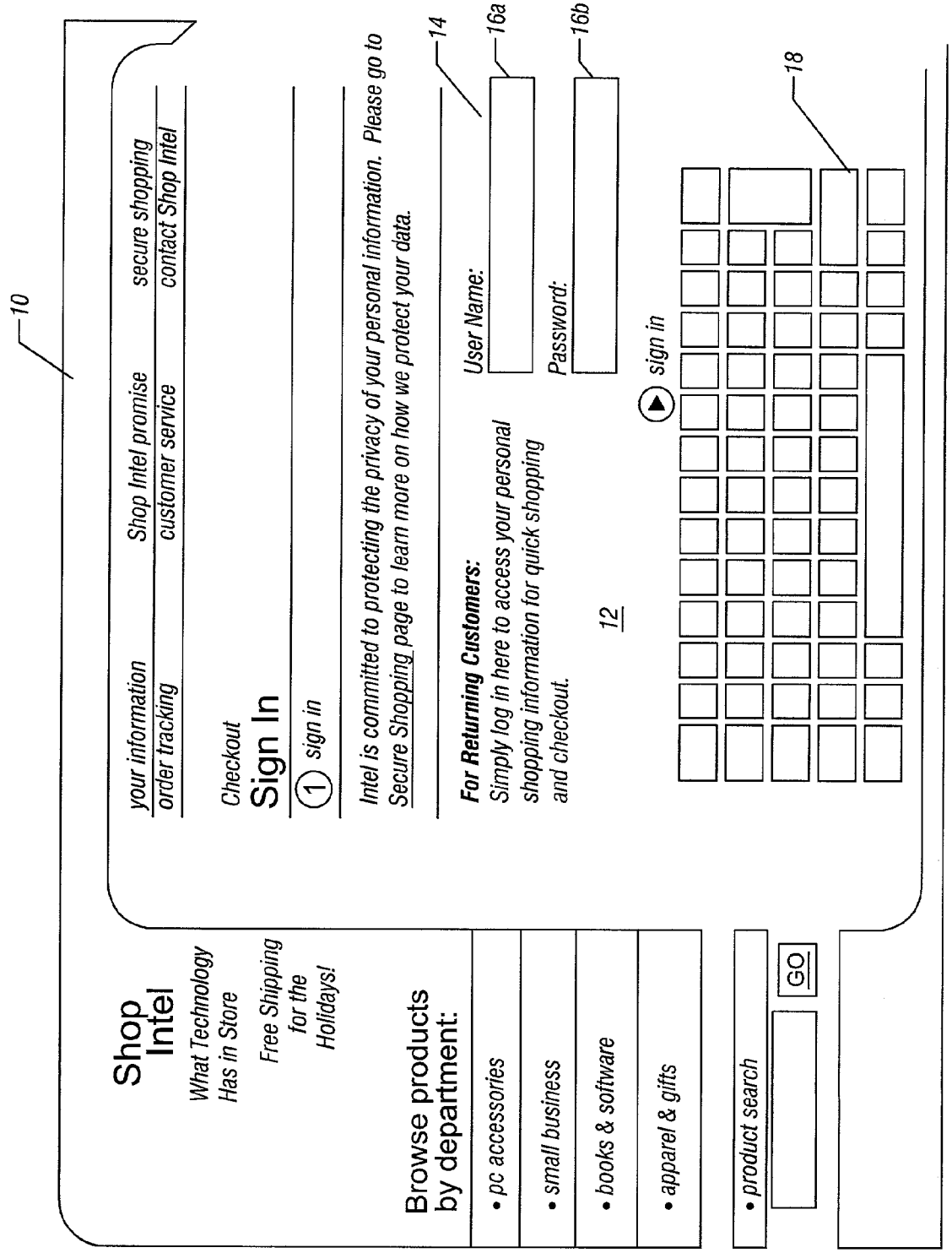
FIG. 2 is a depiction of a keyboard image imposed over the screen display in accordance with one embodiment of the present invention.

In some cases, to facilitate the entry of characters into the data entry areas 16*a* and 16*b*, an on-screen keyboard image 18 may be displayed as shown in FIG. 2. The keyboard image 18 may include a plurality of user selectable character key images to facilitate data entry. The user may select key images by touching those images in the case of a touch screen with a finger or a stylus. In other cases, a mouse cursor may be positioned over the key image and the image may be selected using a mouse click operation.

The user may elect to use the keyboard image 18 for data entry by selecting an appropriate software icon that may be displayed on the screen display 10, as one example. Alternatively, selecting (e.g., touching) a text entry field may cause the keyboard image 18 to be displayed automatically. As still another example, a device associated with the screen display 10 may include an appropriate hardware button to enable the user to select the presentation of the keyboard image 18. Using a variety of techniques, the user may select to display the keyboard image 18.

Once the keyboard image 18 is selected, the keyboard image 18 may be prevented from overlaying important information on the screen display 10. That important information may include the data entry areas 16a and 16b as well as information, indicated at field 12, that may facilitate character entry or advise the user about how to enter the data. If either or both of these types of information are obscured by the keyboard image 18, the entry of the desired data may be more difficult.

As is shown in FIG. 2, the keyboard image 18 may be positioned at a location that would have obscured at least the data entry area 16b. However, in this case, the data entry areas 16a and 16b may be rearranged to appear in the field 14. In the case where the user has selected the keyboard image 18, it is known by deduction that the user must not be a new customer and therefore does not need the field 14. The field 14 instead may be utilized to receive the data entry areas 16a and 16b. As a result, useless information may be removed from the field 14 of the display screen 10 and the field 14 may instead be filled with data entry areas 16a and 16b.

Figure 3:
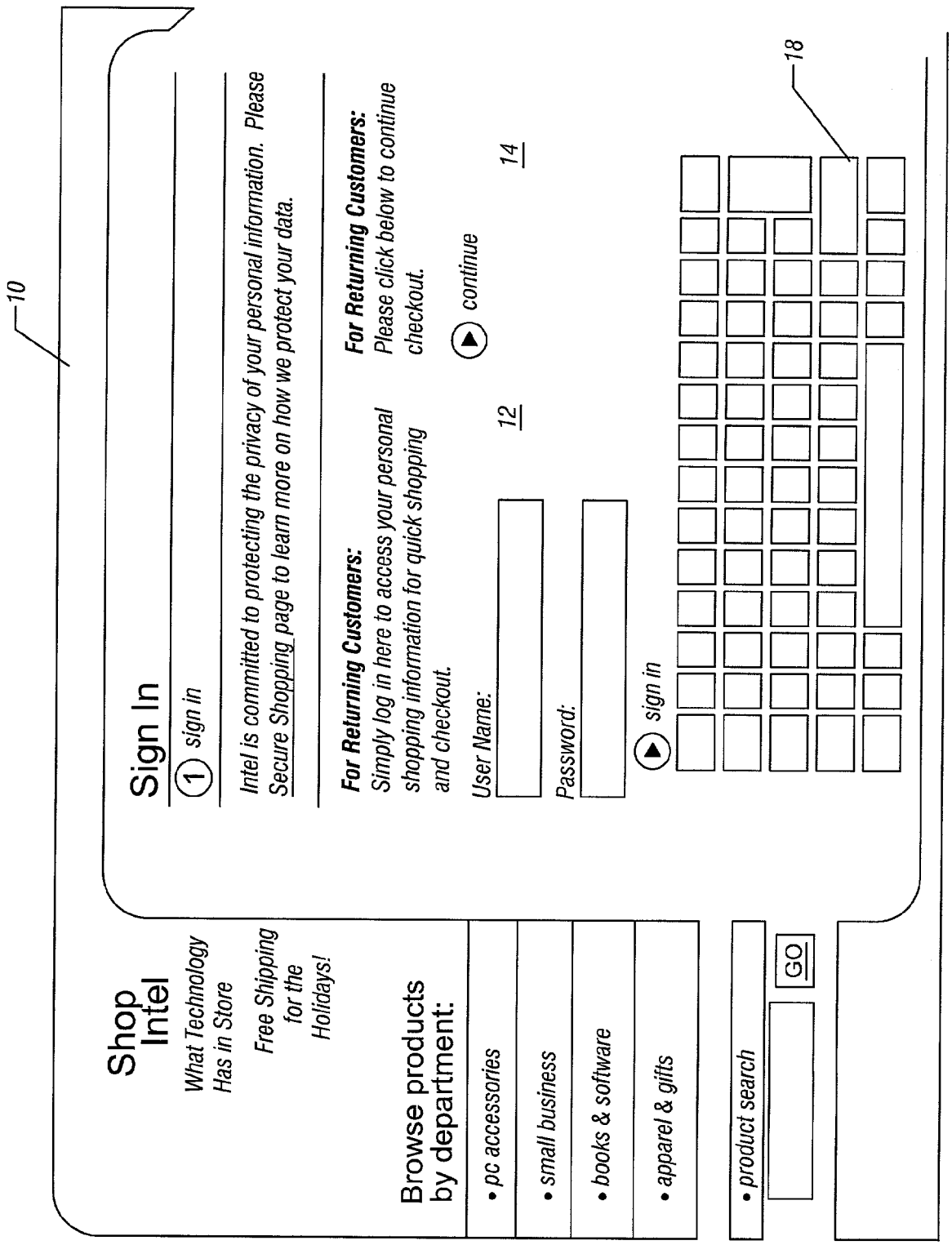
FIG. 3 is a depiction of another embodiment in accordance with the present invention.

As another alternative, the software may scroll the portion of the displayed page above (or below) the keyboard image 18 without modifying the actual page content as shown in FIG. 3. In one embodiment, the displayed page may be automatically scrolled upwardly so that the portion 15 (in FIG. 1) is no longer displayed. The scrolling of the display insures that the data entry areas 16 and particularly a selected data entry area 16 is usable without being obscured by the keyboard image 18.

This shifting of data avoids the nuisance that either the data entry areas 16a and 16b or associated information in the field 12 may be obscured by the keyboard image 18 thereby making data entry more difficult. By recognizing where the various information is located on the current screen display, the keyboard image 18 may be positioned and important information may be relocated on the screen display to facilitate data entry.

Figure 4:
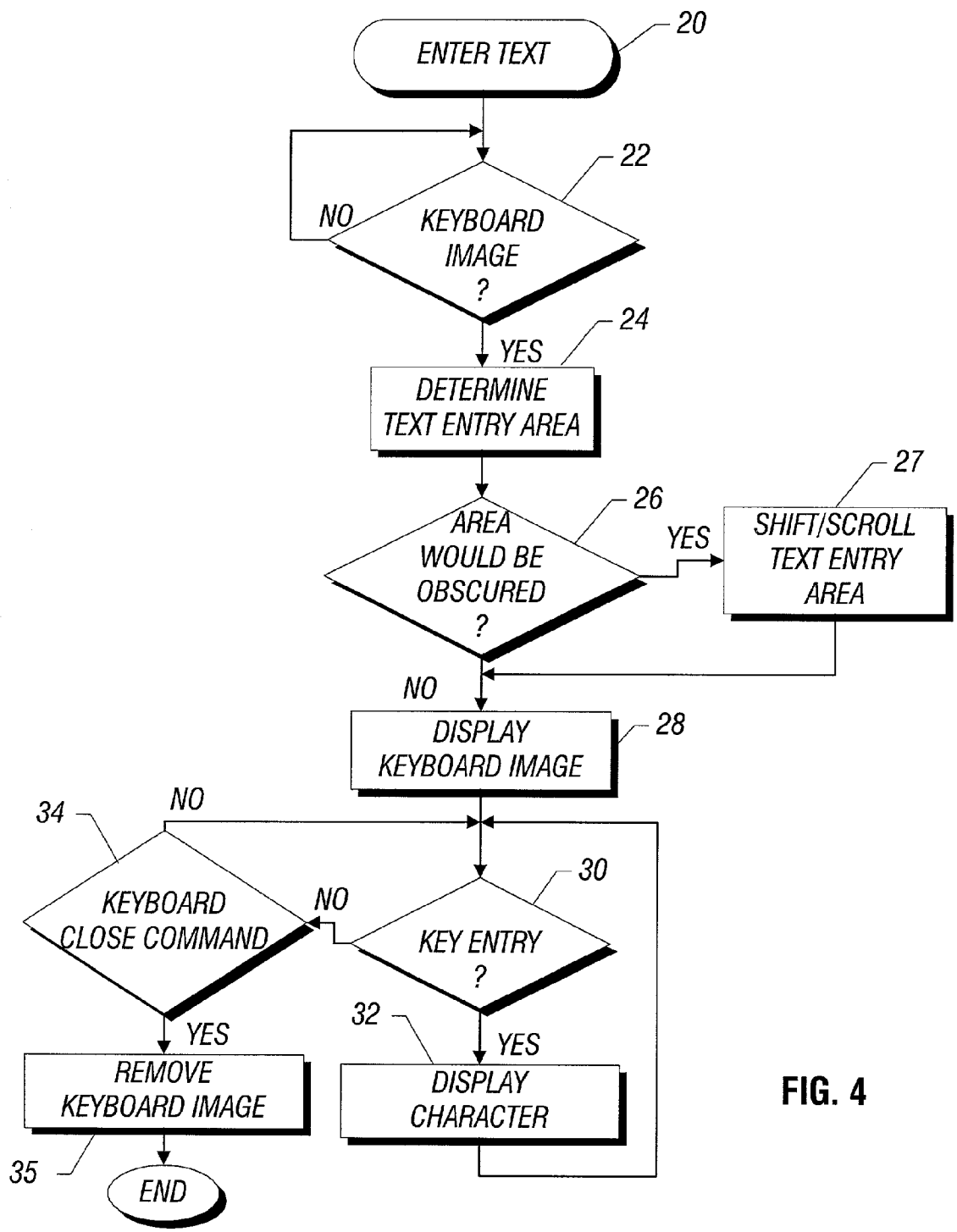
FIG. 4 is a flow chart for software in accordance with one embodiment of the present invention.

Turning next to FIG. 4, the data entry software 20, in accordance with one embodiment of the present invention, begins by determining whether the keyboard image 18 has been selected, as indicated in diamond 22. Again, there are a variety of ways for the user to select the keyboard image 18 to facilitate data entry. Once one of these techniques is identified and recognized, the system checks to determine whether, in a then existing screen display, a data entry area 16 is provided, as indicated in diamond 24. Again, the identity of a data entry area 16 may be determined in a variety of different ways. In one example, characteristic coding, for data entry areas such as text entry blocks and other conventional data entry interfaces may be recognized. Thus, a data entry area 16 may be identified and its location determined.

The software 20 then determines whether it is necessary to move a data entry area 16 and any associated text to position the keyboard image 18 in an appropriate location. If so, the appropriate data entry area 16 and other text may be shifted or scrolled, as indicated in block 27, to a more appropriate location. As a result, in some embodiments, the appropriate text, the data entry area 16 and the keyboard image 18 may be displayed in an unobstructed fashion as shown in FIGS. 2 and 3.

Once the screen layout has been determined, the keyboard image 18 may be displayed as indicated in block 28. Then, when a key entry is detected in diamond 30, the appropriate character may be displayed. This process may be repeated until a keyboard image 18 close command is detected (see diamond 34) in one embodiment. Upon the occurrence of a close command, the keyboard image 18 is removed as indicated in block 35.

Figure 5:
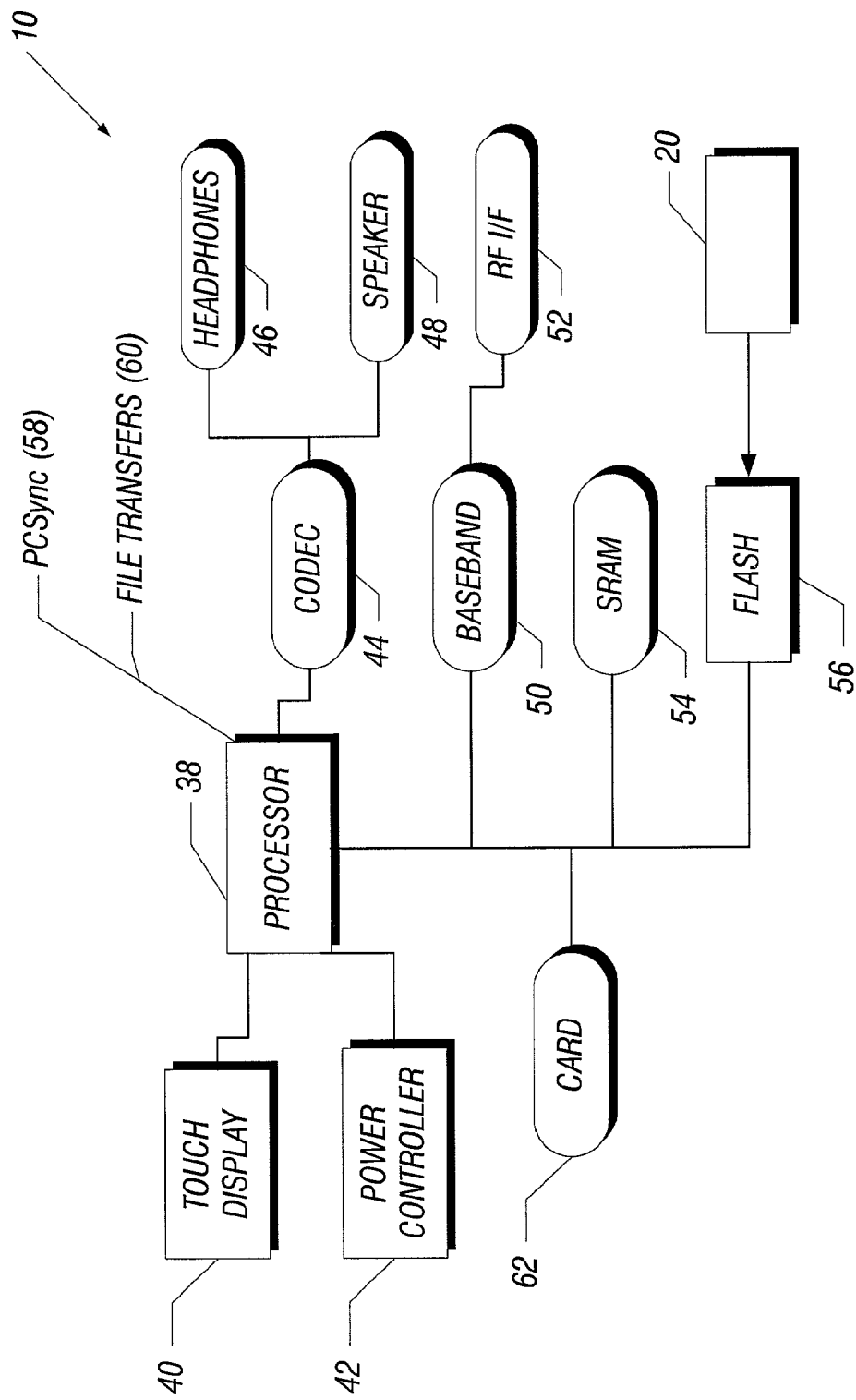
FIG. 5 is a block diagram of a hardware implementation in accordance with one embodiment of the present invention.

Finally, referring to FIG. 5, one embodiment of a processor-based system 36 to implement the present invention is illustrated. Of course, the present invention is not in any way limited to any particular hardware architecture or arrangement. The embodiment shown in FIG. 4 is simply an illustration of a wireless mobile processor-based device.

In the system 36, a processor 38 is coupled to a touch screen display 40 and a power controller 42. The processor 38, in one embodiment, may be the StrongARM brand processor available from Intel Corporation. The processor 38 may also communicate with a host processor-based system using sync signals 58 and file transfer signals 60. Thus, the system 36 may be synchronized by transferring data from the system 36 to a host system (not shown) such as a desktop computer or other processor-based system.

The processor 38 is also coupled to a coder/decoder or codec 44. The codec 44 provides an analog output signal to headphones 46 or speakers 48.

A baseband section 50 is coupled to a radio frequency interface 52 in one embodiment. The interface 52 may facilitate communications with a base station using a wireless protocol. This may be the case in a variety of portable devices including web tablets and personal digital assistants, as two examples. In other embodiments, the system 36 may be a standalone system, may communicate over a tethered cable with a base station, or may use other wireless techniques such as infrared technology.

The processor of 38 is also coupled to a static random access memory (SRAM) 54 and a flash memory 56 in one embodiment. In that embodiment, the data entry software 20 may be stored in the flash memory 56. Of course, other types of storage devices, such as hard disk drives, may also be used in other applications. The processor 38 is also coupled to one or more peripheral cards 62.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    displaying a keyboard image on a user interface; and
    moving a data entry area on said interface to display said keyboard image.

2. The method of claim 1 including moving a data entry area on said interface to enable an unobstructed view of said keyboard image and said data entry areas.

3. The method of claim 1 including searching for coding associated with data entry areas to identify the location of a data entry area.

4. The method of claim 3 including searching for characteristic coding of a web page.

5. The method of claim 1 including moving data from the location where a keyboard image is to be positioned and positioning said data at another location on said interface.

6. The method of claim 1 including scrolling the data entry area to prevent the data entry area from being obscured by the keyboard image.

7. An article comprising a medium storing instructions that enable a processor-based system to:
    display a keyboard image on a user interface; and
    move a data entry area on said interface to display said keyboard image.

8. The article of claim 7 further storing instructions that enable the processor-based system to move a data entry area on said interface to enable an unobstructed view of the keyboard image and the data entry area.

9. The article of claim 7 further storing instructions that enable the processor-based system to search for coding associated with data entry areas to identify the location of a data entry area.

10. The article of claim 9 further storing instructions that enable the processor-based system to search for characteristic coding of a web page.

11. The article of claim 7 further storing instructions that enable the processor-based system to move data from a location where a keyboard image is to be positioned and position the data at another location on the interface.

12. The article of claim 7 further storing instructions that enable the processor-based system to scroll the data entry area to prevent the data entry area from being obscured by the keyboard image.

13. A system comprising:
 a processor; and
 a storage coupled to the processor, the storage storing instructions that enable the processor to display a keyboard image on a user interface and move a data entry area on the interface to display the keyboard image.

14. The system of claim 13 wherein the storage stores instructions to enable the processor to move a data entry area on the interface to enable an unobstructed view of the keyboard image and the data entry area.

15. The system of claim 13 wherein the storage stores instructions to enable the processor to search for coding associated with data entry areas to identify the location of a data entry area.

16. The system of claim 15 wherein the storage stores instructions that enable the processor to search for a characteristic coding of a web page to locate a data entry area.

17. The system of claim 13 wherein the storage stores instructions that enable the processor to move data from a location where a keyboard image is to be positioned and to position the data at another location on the interface.

18. The system of claim 13 further including a touch screen coupled to the processor.

19. The system of claim 13 wherein said storage stores instructions to determine whether the image will obscure the data entry area and, if so, to move the data entry area.

20. The system of claim 19 wherein said storage stores instructions to scroll the display to avoid the keyboard image from obscuring the data entry area.

* * * * *